United States Patent [19]

McKinney et al.

[11] 4,083,807
[45] Apr. 11, 1978

[54] METHOD FOR PREPARING CRYSTALLINE ALUMINOSILICATE CRACKING CATALYSTS

[75] Inventors: Joel D. McKinney, Pittsburgh; Bruce R. Mitchell, Sarver; Raynor T. Sebulsky, Pittsburgh, all of Pa.

[73] Assignee: Gulf Research & Development Company, Pittsburgh, Pa.

[21] Appl. No.: 648,799

[22] Filed: Jan. 13, 1976

[51] Int. Cl.² .................... B01J 29/06; C10G 11/02
[52] U.S. Cl. ............................... 252/455 Z; 208/120
[58] Field of Search ................. 252/455 Z; 208/120

[56] References Cited

U.S. PATENT DOCUMENTS

| | | | |
|---|---|---|---|
| 3,236,762 | 2/1966 | Rabo et al. | 252/455 Z |
| 3,346,512 | 10/1967 | Gladrow et al. | 252/455 Z |
| 3,527,824 | 9/1970 | Pollitzer | 252/455 Z |
| 3,711,422 | 1/1973 | Johnson et al. | 208/120 X |
| 3,876,558 | 4/1975 | Granquist | 252/455 Z |
| 3,977,963 | 8/1976 | Readal et al. | 208/120 |

*Primary Examiner*—Carl F. Dees

[57] ABSTRACT

An improved catalytic cracking catalyst is obtained by a method which comprises incorporating into a crystalline aluminosilicate catalyst by ion exchange a substantial concentration of a metal selected from the group consisting of antimony, bismuth and manganese.

4 Claims, No Drawings

METHOD FOR PREPARING CRYSTALLINE ALUMINOSILICATE CRACKING CATALYSTS

BACKGROUND OF THE INVENTION

Catalytic cracking processes are employed to produce gasoline and light distillate fractions from heavier hydrocarbon feed stocks. These cracking processes include fixed bed operations and fluid catalytic riser cracking processes. Preferred catalysts employed in such processes for the cracking of hydrocarbons boiling substantially above 600° F. (316° C.) comprise a crystalline aluminosilicate dispersed in a refractory metal oxide matrix such as disclosed in U.S. Pat. No. 3,140,249 and 3,140,253 to C. J. Plank and E. J. Rosinski.

The catalytic cracking processes of the prior art are normally conducted until the metal contaminants concentration on the catalyst reaches about 1500 parts per million (ppm) nickel equivalents (ppm nickel + 0.2 ppm vanadium) at which time the catalyst is replaced by fresh catalyst. The incremental replacement of the catalyst is expensive to insure that the maximum acceptable level of metal contaminants is not exceeded and a number of methods have been investigated for the purpose of lowering this high replacement cost. For example, it has been proposed to reduce the concentration of metals in the feed stock by pretreatment of the contaminated feed to lower the concentrations of metals to below about 1 ppm. A second suggestive method is to exclude by fractionation the heavier gas oils and residual fractions where the major concentrations of metal contaminants occur.

The proposed methods have been only partially successful and as the necessity for increasing the conversion of heavier feed stocks to the lower boiling product fractions becomes more important, it is evident that improved catalytic cracking processes which permit the charging of feed stocks containing relatively high concentrations of metals are needed. Also, it is desirable to reduce the rate of replacement of catalytic cracking catalysts attributable to the buildup of metal contaminants on the catalyst.

SUMMARY OF THE INVENTION

By the invention an improved cracking catalyst for processing feed stocks containing relatively high concentrations of metal contaminants is provided which comprises contacting a crystalline aluminosilicate composition with a salt of a metal selected from the group consisting of antimony, manganese and bismuth under ion exchange conditions to obtain a crystalline aluminosilicate composition containing a substantial concentration of said metal.

DESCRIPTION OF THE INVENTION

The cracking catalysts of this invention are those containing zeolite or molecular sieves which are generally characterized as being crystalline, three-dimensional, stable structures containing a large number of uniform openings or cavities interconnected by relatively uniform channels. The formula for the zeolites can be represented as follows:

$$xM_{2/n}O:Al_2O_3: 1.5-6.5 \ SiO_2:yH_2O$$

where M is a metal cation and $n$ its valence; $x$ varies from 0 to 1; and $y$ is a function of the degree of dehydration and varies from 0 to 9. M is preferably a rare earth metal cation such as lanthanum, cerium, praseodymium, neodymium or mixtures thereof.

Zeolites which can be employed in the practice of this invention include both natural and synthetic zeolites. These natural occurring zeolites include gmelinite, chabazite, dachiardite, clinoptilolite, faujasite, heulandite, analcite, levynite, erionite, sodalite, cancrinite, nepheline, lazurite, scolecite, natrolite, offretite, mesolite, mordenite, brewsterite, ferrierite, and the like. Suitable synthetic zeolites which can be employed in the inventive process include zeolites X, Y, A, L, ZK-4, B, E, F, H, J, M, Q, T, W, Z, alpha and beta, ZSM-types and omega. The effective pore size of synthetic zeolites are suitably between 6 and 15 A in diameter. The term "zeolites" as used herein contemplates not only aluminosilicates but substances in which the aluminum are replaced by gallium and substances in which the silicon is replaced by germanium. The preferred zeolites are the synthetic faujasites of the types Y and X or mixtures thereof.

It is also well known in the art that to obtain good cracking activity the zeolites must be in good cracking form. In most cases this involves reducing the alkali metal content of the zeolite to as low a level as possible, as a high alkali metal content reduces the thermal structural stability, and the effective lifetime of the catalyst is impaired. Procedures for removing alkali metals and putting the zeolite in the proper form are hereafter described.

The crystalline alkali metal aluminosilicate can be cation-exchanged by treatment with a solution essentially characterized by a pH in excess of about 4.5, preferably by a pH in excess of 5, and containing an ion capable of replacing the alkali metal. The alkali metal content of the finished catalyst should be less than about 1 and preferably less than about 0.5 percent by weight. The cation-exchange solution can be contacted with the crystalline aluminosilicate of uniform pore structure in the form of a fine powder, a compressed pellet, extruded pellet, spheroidal bead or other suitable particle shapes.

In preparing the novel catalyst compositions of this invention, an ionizable inorganic salt of a metal selected from the group consisting of antimony, bismuth and manganese can be employed in preparation of the cation-exchange solution in an amount such as to provide a concentration of the metal in the final catalyst composite of at least 0.25 weight percent and normally in the range of 0.25 to 2.5 weight percent.

In replacing at least about 90 percent of the alkali metal originally contained in the aluminosilicate, additional ionizable inorganic metal salt compounds can be employed. Such additional materials include soluble compounds of calcium, magnesium, vanadium, chromium, aluminum, cerium, lanthanum, and other rare earths as well as solutions containing mixtures of these ions and mixtures of the same and other ions such as ammonium. The ion exchange of one or more of these additional materials can be effected simultaneously with the ion exchange reaction conducted with the antimony, bismuth, and/or manganese or preferably in a second or subsequent ion exchange step. Organic salts of antimony, bismuth and manganese and of the other foregoing metals, such as the acetate and formate, can also be employed, as well as very dilute or weak acids.

Ion exchange of the zeolite can be accomplished at ambient or elevated temperatures below the boiling point of the treating solution, by packing the zeolites in the form of beds and successfully passing through the beds a water solution of a soluble salt of the cation to be introduced into the zeolite. While water will ordinarily be the solvent in the cation-exchange solutions employed, it is contemplated that other solvents can also be used. Thus, in addition to an aqueous solution, alcohol solutions and the like of the exchange compounds can be employed in producing the catalysts of the present invention.

In the preparation of the novel catalysts, it may be desired to incorporate the zeolite with another matrix material such as an inorganic refractory oxide. For example, finely divided zeolite can be admixed with the finely divided matrix material to form a catalyst composite containing from 5 to 40 weight percent zeolite and the mixture spray dried to form the catalyst composite. Other suitable methods of dispersing the zeolite materials in the matrix materials are described in U.S. Pat. Nos. 3,271,418; 3,717,587; 3,657,154; and 3,676,330 whose descriptions are incorporated therein by reference thereto.

In addition to the zeolite component, another material useful in preparing the catalyst compositions of this invention is the laminar 2:1 layer-lattice aluminosilicate materials described in U.S. Pat. No. 3,852,405. The preparation of such materials is described in the said patent and the disclosure therein as to the preparation of such materials is incorporated in this application by reference thereto. Such laminar 2:1 layer-lattice aluminosilicate materials can be combined with the zeolitic component alone or in combination with the previously described matrix material. Normally, although not to be limited thereto, the concentration of such layer-lattice aluminosilicate materials in the catalytic compositions of this invention will range from about 10 to 95 weight percent.

Although not to be limited thereto, suitable metallic salts which can be employed in the ion exchange step of this invention include antimony acetate, antimony lactate, antimony trichloride, antimony pentachloride, antimony fluoride, manganese acetate, manganese chloride, manganese nitrate, manganese oxalate, manganese phosphate, manganese bromide, manganese sulfate, bismuth nitrate, bismuth chloride and bismuth sulfate.

The catalyst compositions of this invention are employed in the cracking of charge stocks to produce gasoline and light distillate fractions from heavier hydrocarbon feed stocks. The charge stocks generally are those having an average boiling temperature above 600° F. (316° C.) and include materials such as gas oils, cycle oils, residuums and the like. Conventional catalytic cracking charge stocks contain less than 1.5 ppm nickel equivalents as metals contaminants.

The charge stocks employed in the process of this invention can contain significantly higher concentrations of metal contaminants as the catalysts are effective in cracking processes operated at metal contaminant levels exceeding 1500 ppm nickel equivalents. As hereafter described, the process employing the catalysts prepared by the ion exchange of antimony, bismuth, or manganese is effective at metal contaminant levels exceeding 2500 ppm nickel equivalents and even exceeding 5000 ppm nickel equivalents. Thus, the charge stocks to the catalytic cracking process of this invention can contain metal contaminants in the range up to 3.5 ppm and higher nickel equivalents.

Although not to be limited thereto, a preferred method of employing the catalysts of this invention is by fluid catalytic cracking using riser outlet temperatures between about 900° to 1100° F. (482° to 593° C.). The invention will hereafter be described as it relates to a fluid catalytic cracking process although those skilled in the art will readily recognize that the invention is equally applicable to those catalytic cracking processes employing a fixed catalyst bed.

Under fluid catalytic cracking conditions the cracking occurs in the presence of a fluidized composited catalyst in an elongated reactor tube commonly referred to as a riser. Generally, the riser has a length to diameter ratio of about 20. The charge stock is passed through a preheater which heats the feed to a temperature of about 600° F. (316° C.) and the heated feed is then charged into the bottom of the riser.

In operation, a contact time (based on feed) of up to 15 seconds and catalyst to oil weight ratios of about 4:1 to about 15:1 are employed. Steam can be introduced into the oil inlet line to the riser and/or introduced independently to the bottom of the riser so as to assist in carrying regenerated catalyst upward through the riser. Regenerated catalyst at temperatures generally between about 1100° and 1350° F. (593° to 732° C.) is introduced into the bottom of the riser.

The riser system at a pressure in the range of about 5 to about 50 psig (0.35 to 3.50 kg/cm$^2$) is normally operated with catalyst and hydrocarbon feed flowing concurrently into and upward into the riser at about the same flow velocity, thereby avoiding any significant slippage of catalyst relative to hydrocarbon in the riser and avoiding formation of a catalyst bed in the reaction flow stream. In this manner the catalyst to oil ratio thus increase significantly from the riser inlet along the reaction flow stream.

The riser temperature drops along the riser length due to heating and vaporization of the feed and by the slightly endothermic nature of the cracking reaction and heat loss to the atmosphere. As nearly all the cracking occurs within one or two seconds, it is necessary that feed vaporization occurs nearly instantaneously upon contact of feed and regenerated catalyst at the bottom of the riser. Therefore, at the riser inlet, the hot, regenerated catalyst and preheated feed, generally together with a mixing agent such as steam, (as hereto described) nitrogen, methane, ethane or other light gas, are intimately admixed to achieve an equilibrium temperature nearly instantaneously.

The catalyst containing metal contaminants and carbon is separated from the hydrocarbon product effluent withdrawn from the reactor and passed to a regenerator. In the regenerator the catalyst is heated to a temperature in the range of about 800° to about 1600° F. (427° to 871° C.), preferably 1160° to 1260° F. (627° to 682° C.), for a period of time ranging from three to thirty minutes in the presence of a free-oxygen containing gas. This burning step is conducted so as to reduce the concentration of the carbon on the catalyst to less than 0.3 weight percent by conversion of the carbon to carbon monoxide and carbon dioxide.

Conventional catalytic processes can operate with catalysts containing contaminated metals concentrations greater than 1000 ppm nickel equivalents but at a substantial loss of product selectivity and conversion. Further, under such conditions undesirably high concentrations of coke, hydrogen and light gas are produced. By employing the defined catalyst, the contaminant metals level on the catalyst can exceed 2500 ppm nickel equivalents while obtaining a conversion and gasoline yield normally effected by conventional catalysts containing only 500 ppm nickel equivalent metal contaminants.

Yields of gasoline and carbon are not significantly effected up to metal contaminant levels of 5000 ppm nickel equivalents. Although hydrogen yields increase with increasing metals contamination above 3000 ppm, the rate of increase is substantially less than that normally obtained in conventional hydrocarbon cracking processes. Thus, by this invention the cracking process can be operated efficiently with a metal contaminant concentration on the catalyst up to at least 5000 ppm nickel equivalents.

As previously indicated, the process of this invention has a significant advantage over conventional catalytic cracking processes by providing an economically attractive method to include higher metals-containing gas oils as a feed to the catalytic cracking process. Because of the loss of selectivity to high value products (loss of conversion and yield of gasoline, and gain in coke and light gases) with the increased metals contamination on conventional cracking catalysts, most refiners attempt to maintain a low metals level on the cracking catalyst — less than 1000 ppm. An unsatisfactory method of controlling metals contamination in addition to those previously discussed is to increase the catalyst makeup rate to a level higher than that required to maintain activity or to satisfy unit losses.

Antimony, bismuth and manganese can be exchanged into the zeolite prior to incorporation of the zeolite into a suitable matrix or can be exchanged into the zeolite-matrix catalyst composite. The incorporation of antimony, bismuth and manganese by ion exchange into the zeolite produces a catalyst having substantially greater stability than would result if antimony, bismuth or manganese were added to the zeolitic catalyst by another method such as impregnation.

The following examples are presented to illustrate objects and advantages of the invention. However, it is not intended that the invention should be limited to the specific embodiments presented therein.

EXAMPLE I

In this Example, the effectiveness of the ion-exchanged zeolitic catalytic composition as prepared by the process of this invention in inhibiting the effects of metals contamination in a FCC process is demonstrated. The material employed in preparing the catalyst of this Example was a crystalline aluminosilicate dispersed in refractory oxide matrix. The physical characteristics and chemical composition of the material, after heating for three (3) hours at a temperature of 1025° F. (552° C.) and before the addition of antimony by an ion exchange step, was as follows:

| Physical Characteristics | |
|---|---|
| Surface Area: $M^2/G$ | 181.1 |
| Pore Volume (Nitrogen Adsorption): CC/G | 0.210 |
| Apparent Bulk Density: G/CC | 0.700 |
| Particle Size Distribution | |
| 0–20 Microns | 2.0 |
| 20–40 Microns | 14.7 |
| 40–80 Microns | 46.4 |
| >80 Microns | 36.9 |
| >80/<40μ | 2.20 |
| Chemical Composition: Weight % | |
| Iron ($Fe_2O_3$) | 0.529 |
| Sodium | 0.56 |
| Alumina ($Al_2O_3$) | 42.34 |
| Cerium | 0.20 |
| Lanthanum | 1.20 |
| Titanium | 0.52 |

In preparation of the novel catalyst, the above-identified material was slurried with an aqueous solution of antimony trichloride at 80° C. unitl the catalyst contained 0.74 weight percent antimony.

In each of Runs 1 and 2, a gas oil having a boiling range of 260° C. to 427° C. was passed through the prepared catalyst composition contained in a fixed bed. The catalytic cracking reaction conditions maintained during the run were a reaction temperature of 482° C., a weight hourly space velocity of 15.02, and a contact time of 80.5 seconds. Run No. 1 was conducted with a catalyst composition containing no metal contaminants. Run No. 2 was conducted after 2570 nickel equivalents as metal contaminants had been added to the catalyst. The conversion, $C_5+$ gasoline, carbon and hydrogen produced in each of the runs were as shown below in Table I.

TABLE I

| Run No. | Conversion, Vol % of Feed | $C_5+$ Gasoline, Vol % of Feed | Carbon Produced, Wt % of Feed | Hydrogen Produced, Wt % of Feed |
|---|---|---|---|---|
| 1 | 72.3 | 46.1 | 4.83 | 0.09 |
| 2 | 75.4 | 45.7 | 6.54 | 0.23 |

A comparison of the results obtained in Runs 1 and 2 clearly demonstrates the effectiveness of the novel zeolitic catalyst when operating at metal contaminant levels substantially higher than those conventionally found in catalytic cracking operations to produce gasoline and other lower boiling fractions without any penalty in conversion or $C_5+$ gasoline production.

EXAMPLE II

In this Example, the effectiveness of an ion-exchanged sodium Y-zeolite (Linde SK-40) in inhibiting the effects of metals contamination in a FCC process is demonstrated. The catalyst composite was prepared by contacting 800 grams of the sodium Y-zeolite dispersed in water with 360 grams of ammonium chloride at 80° C. in two contact steps with intermediate calcination. 800 grams of the prepared zeolite in water was thereafter contacted with 140 grams of antimony triacetate at 80° C. 564 grams of rare earth chlorides were then contacted with 800 grams of the zeolite slurried in water at 80° C. in a plurality of contact steps with intermediate calcination. The exchanged zeolite after calcination and drying was thereafter dry mixed with halloysite to obtain a final catalyst composite containing 15 weight percent zeolite and 1.43 weight percent antimony.

In each of Runs 3 and 4 of this Example, a gas oil having a boiling range of 260° C. to 427° C. was passed through the prepared catalyst composition contained in a fixed bed. The catalytic cracking reaction conditions maintained during these runs were a reaction temperature of 482° C., a weight hourly space velocity of 15.02, and a contact time of 80.5 seconds. Run No. 3 was conducted with the catalyst composition containing no metal contaminants. Run No. 4 was conducted after 2,570 nickel equivalents as metal contaminants had been added to the catalyst. The conversion, $C_5+$ gasoline, carbon and hydrogen produced in each of the runs were as shown below in Table II.

TABLE II

| Run No. | Conversion, Vol % of Feed | C$_5$+ Gasoline, Vol % of Feed | Carbon Produced, Wt % of Feed | Hydrogen Produced, Wt % of Feed |
|---|---|---|---|---|
| 3 | 44.0 | 32.1 | 1.84 | 0.10 |
| 4 | 42.4 | 32.5 | 2.97 | 0.18 |

A comparison of the results obtained in Runs 3 and 4 demonstrates the effectiveness of the zeolitic catalyst when prepared by ion exchange and when operating at metal contaminants substantially higher than those conventionally found in catalytic cracking operations to produce gasoline and other lower boiling fractions without any significant loss in conversion or C$_5$+ gasoline production.

Although the invention has been described with reference to specific embodiments, references, and details, various modifications and changes will be apparent to one skilled in the art and are contemplated to be embraced in this invention.

We claim:

1. A method which comprises preparing a zeolitic catalyst composition by contacting a cracking catalyst composition containing a crystalline aluminosilicate zeolite with an ionizable salt of a metal selected from the group consisting of antimony and bismuth under ion exchange conditions, recovering therefrom a crystalline aluminosilicate catalyst composition containing at least 0.25 weight percent of said metal, and thereafter contacting said catalyst composition under cracking conditions with a hydrocarbon charge stock containing at least 3.5 ppm nickel equivalents as metal contaminants and having an average boiling temperature above 600° F.

2. A method which comprises preparing a zeolitic catalyst composition by contacting a crystalline aluminosilicate with an ionizable salt of a metal selected from the group consisting of antimony and bismuth under ion exchange conditions, recovering therefrom a crystalline aluminosilicate catalyst composition containing at least 0.25 weight percent of said metal, and thereafter contacting said catalyst composition under cracking conditions with a hydrocarbon charge stock having an average boiling temperature above 600° F. until the said catalyst composition contains in excess of 1,500 ppm nickel equivalents as metal contaminants.

3. The method of claim 1 wherein said catalyst composition contains a laminar 2:1 layer lattice aluminosilicate material in an amount ranging from 10 to 95 weight percent.

4. The method of claim 2 wherein said catalyst composition contains a laminar 2:1 layer lattice aluminosilicate material in an amount ranging from 10 to 95 weight percent.

* * * * *